(12) United States Patent
Kaczun et al.

(10) Patent No.: US 9,296,907 B2
(45) Date of Patent: Mar. 29, 2016

(54) RADIATION-CURABLE COMPOUNDS

(71) Applicant: BASF SE, Ludwigshafen (DE)

(72) Inventors: Juergen Kaczun, Wachenheim (DE);
Reinhold Schwalm, Wachenheim (DE);
David Trumbo, Wyandotte, MI (US);
Eugene Valentine Sitzmann,
Wyandotte, MI (US)

(73) Assignee: BASF SE, Ludwigshafen (DE)

(*) Notice: Subject to any disclaimer, the term of this patent is extended or adjusted under 35 U.S.C. 154(b) by 156 days.

(21) Appl. No.: 13/905,514

(22) Filed: May 30, 2013

(65) Prior Publication Data
US 2013/0323426 A1    Dec. 5, 2013

Related U.S. Application Data

(60) Provisional application No. 61/652,871, filed on May 30, 2012.

(51) Int. Cl.
| | | |
|---|---|---|
| C08F 2/46 | (2006.01) |
| C08G 61/04 | (2006.01) |
| C09D 11/101 | (2014.01) |
| C09D 175/04 | (2006.01) |
| C08G 18/81 | (2006.01) |
| C09D 175/16 | (2006.01) |

(52) U.S. Cl.
CPC .......... *C09D 11/101* (2013.01); *C08G 18/8116* (2013.01); *C09D 175/04* (2013.01); *C09D 175/16* (2013.01)

(58) Field of Classification Search
CPC .. C09D 11/101; C09D 175/04; C09D 175/16; C08G 18/8116
USPC ................... 522/174, 173, 1; 520/1
See application file for complete search history.

(56) References Cited

U.S. PATENT DOCUMENTS

| | | | |
|---|---|---|---|
| 3,214,492 A | 10/1965 | Tocker et al. |
| 3,429,852 A | 2/1969 | Skoultchi et al. |
| 3,622,848 A | 11/1971 | Hendrix |
| 4,304,895 A | 12/1981 | Loshaek |
| 6,617,413 B1 * | 9/2003 | Bruchmann et al. ............ 528/75 |

FOREIGN PATENT DOCUMENTS

| | | |
|---|---|---|
| DE | 195 01 025 A1 | 7/1996 |
| DE | 196 18 720 A1 | 11/1996 |
| DE | 198 26 712 A1 | 12/1999 |
| DE | 199 13 353 A1 | 9/2000 |
| DE | 102 46 512 A1 | 4/2004 |
| DE | 10 2006 047 8 | 4/2007 |
| DE | 102006047863 * | 4/2007 |
| EP | 0 007 508 A2 | 2/1980 |
| EP | 0 057 474 A2 | 8/1982 |
| EP | 0 092 269 A1 | 10/1983 |
| EP | 0 495 751 A1 | 7/1992 |
| EP | 0 615 980 A2 | 9/1994 |
| EP | 0 632 329 A1 | 1/1995 |
| JP | 2012-036253 * | 2/2012 |
| WO | WO 98/33761 A1 | 8/1998 |
| WO | WO 00/39183 A1 | 7/2000 |
| WO | WO 03/068785 A1 | 8/2003 |
| WO | WO 2010/063612 A1 | 6/2010 |

OTHER PUBLICATIONS

Reinhold et al, DE 102006047863 Machine Translation, Apr. 19, 2007.*
Yuasa et al, JP 2012-036253, Feb. 23, 2012.*

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

The invention relates to low-viscosity formulations of radiation-curable compounds, to processes for preparing them, to their use, and to inks, printing-inks, and print varnishes that comprise them.

18 Claims, No Drawings

RADIATION-CURABLE COMPOUNDS

CROSS REFERENCE TO RELATED APPLICATIONS

The present application claims priority to U.S. Provisional application No. 61/652,871 filed May 30, 2012, the entire content of which is hereby incorporated by reference.

The invention relates to low-viscosity formulations of radiation-curable compounds, to processes for preparing them, to their use, and to inks, printing-inks, and print varnishes that comprise them.

U.S. Pat. No. 3,429,852, U.S. Pat. No. 3,214,492, U.S. Pat. No. 3,622,848, and U.S. Pat. No. 4,304,895 disclose acetophenone and benzophenone derivatives as photoinitiators, which are joined—optionally via a spacer group—to a (meth)acrylate group and which therefore are incorporable in a radical polymerization.

DE 19501025 discloses vinyloxycarbonyl groups which are bonded to photoinitiator systems and which are likewise incorporable in a radical polymerization.

Because of the limited possibilities of the spacer structures, however, the compounds disclosed therein are variable only within narrow limits. Moreover, such compounds are often not completely reacted in the course of the UV polymerization, and may consequently migrate from the coating.

WO 03/68785 discloses reactions of acylphosphine oxide-type photoinitiators with diisocyanates. More extensive functionalization of the free isocyanate groups is not disclosed.

WO 03/68783 discloses reactions of optionally hydroxyalkylated acylphosphine oxide photoinitiators with diisocyanates and polyisocyanates. More extensive functionalization of the free isocyanate groups is not disclosed.

EP 632329 discloses photoinitiators of the benzophenone, acetophenone or hydroxyacetophenone type which are functionalized with diisocyanates. The resulting isocyanates can subsequently be derivatized further, as for example by reaction of the free isocyanate group with hydroxyalkyl(meth)acrylates, to give photoinitiators which are incorporable in a radical polymerization.

A disadvantage of this functionalization is that, as a result of the use of diisocyanates, only a low degree of functionalization can be achieved.

DE 10 2006 047 863 A1 describes the attachment of photoinitiators to polyisocyanates for the purpose of rendering them incorporable.

A disadvantage is that the resultant products still have a relatively high viscosity, thereby hindering their incorporability and multivalidiness in coating materials, and more particularly in printing-inks and print varnishes. Moreover, the preparation examples disclosed make use exclusively of dibutyltin dilaurate, which is toxicologically objectionable.

WO 00/39183 describes polyisocyanates which contain allophanate groups and carry radically polymerizable, activated C=C double bonds.

DE 102 46 512 describes a different process for preparing the same compounds as described in WO 00/39183, and also various derivatives of such compounds. Also disclosed is the chemical coupling of polymerization stabilizers by way of free isocyanate groups.

A disadvantage of these polyisocyanates is that for radiation curing with UV they require the addition of a photoinitiator. If photoinitiators are added as separate components, there is, first, a need for an additional metering step, and there is, second, an attendant risk of mismetering. Moreover, in the low molecular mass photoinitiators metered in, there is a risk that they may migrate from the cured coating and accordingly, in the case of use in UV-curable printing-inks for packaging, may pass onto the contents.

It was an object of the present invention to provide photoinitiators which exhibit maximum incorporability into radiation-curable coating materials, and especially inks, printing-inks, and print varnishes, and a relatively low migration tendency, while at the same time having a lower viscosity than comparable products from the prior art. Moreover, the incorporable photoinitiators are not to contain any toxicologically objectionable substances that oppose their usefulness in packaging for food and drink, for example.

This object has been achieved by means of a process for preparing incorporable photoinitiators of low viscosity, comprising the steps of 1) synthesizing a polyurethane A comprising as synthesis components
   (a) at least one polyisocyanate containing allophanate groups and having an NCO functionality of at least 2, synthesized from aliphatic $C_4$ to $C_{20}$ alkylene diisocyanates,
   (b) at least one compound having in each case at least one isocyanate-reactive group and at least one radically polymerizable unsaturated group,
   (c) at least one photoinitiator having at least one isocyanate-reactive group,
   (d) optionally at least one further diisocyanate and/or polyisocyanate, which is different from the compound (a),
   (e) optionally at least one compound having at least two isocyanate-reactive groups, and also
   (f) optionally at least one compound having precisely one isocyanate-reactive group under anhydrous conditions, wherein the polyurethanes (A) are prepared in the presence of less than 1000 ppm by weight of a bismuth-, zinc- and/or titanium-containing compound and in a step 2) the polyurethane (A) obtained from step 1) is mixed with 0.5% to 4% by weight of water, based on the amount of polyurethane (A).

The reaction mixtures obtained when preparing the polyurethanes of the invention generally have a number-average molar weight $M_n$ of less than 10 000 g/mol, preferably of less than 5000 g/mol, more preferably of less than 4000, and very preferably of less than 2000 g/mol (determined by gel permeation chromatography using tetrahydrofuran and polystyrene as standard).

In one preferred embodiment of the invention the polyurethanes of the invention no longer contain virtually any free isocyanate groups, i.e., the amount of free isocyanate groups is less than 0.5% by weight, preferably less than 0.3%, more preferably less than 0.2%, very preferably less than 0.1%, and more particularly less than 0.05%, and especially 0% by weight.

Component (a) comprises polyisocyanates which contain allophanate groups and have an NCO functionality of at least 2, preferably of 2 to 5, and more preferably of 2 to 4. The polyisocyanates (a) containing allophanate groups are synthesized from aliphatic $C_4$ to $C_{20}$ alkylene diisocyanates, preferably from hexamethylene 1,6-diisocyanate.

With particular preference, component (b) is bonded via allophanate groups to component (a).

In accordance with the invention the polyurethanes (A) may contain allophanate groups, the amount of allophanate groups in such polyurethanes of the invention being preferably (calculated as $C_2N_2HO_3=101$ g/mol) 1% to 28% by weight, preferably from 3% to 25% by weight.

In one preferred embodiment of the present invention, of the compounds (b) having in each case at least one isocyanate-reactive group and at least one radically polymerizable unsaturated group that form synthesis components of the polyurethanes (A) of the invention, at least 20 mol %, preferably at least 25 mol %, more preferably at least 30 mol %, very preferably at least 35 mol %, more particularly at least 40 mol %, and especially at least 50 mol % are bonded to allophanate groups.

In one particularly preferred embodiment the compound in question is a polyisocyanate which contains allophanate groups and has the formula (I)

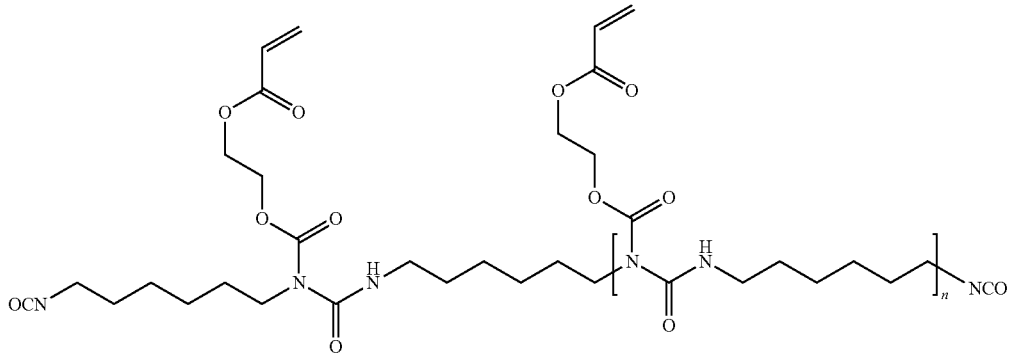

in which n is a positive number which is on average 1 up to 5, preferably from 1 to 3.

Contemplated as component (b) in accordance with the invention is at least one compound (b) which carries at least one isocyanate-reactive group and at least one radically polymerizable group.

The compounds (b) preferably have precisely one isocyanate-reactive group and 1 to 5, more preferably 1 to 4, and very preferably 1 to 3 radically polymerizable groups.

The components (b) preferably have a molar weight of below 10 000 g/mol, more preferably below 5000 g/mol, very preferably below 4000 g/mol, and more particularly below 3000 g/mol. Special components (b) have a molar weight of below 1000 or even below 600 g/mol.

Isocyanate-reactive groups may be, for example, —OH, —SH, —NH$_2$, and —NHR$^1$, where R$^1$ is hydrogen or an alkyl group containing 1 to 4 carbon atoms, such as methyl, ethyl, n-propyl, isopropyl, n-butyl, isobutyl, sec-butyl or tert-butyl, for example.

Components (b) may be, for example, monoesters of α,β-unsaturated carboxylic acids, such as acrylic acid, methacrylic acid, crotonic acid, itaconic acid, fumaric acid, maleic acid, acrylamidoglycolic acid and methacrylamidoglycolic acid, which have preferably 2 to 20 C atoms and at least two hydroxyl groups, such as ethylene glycol, diethylene glycol, triethylene glycol, propylene 1,2-glycol, propylene 1,3-glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyethylene glycol having a molar mass of between 106 and 2000, polypropylene glycol having a molar weight of between 134 and 2000, polyTHF having a molar weight of between 162 and 2000 or poly-1,3-propanediol having a molar weight of between 134 and 400. In addition it is also possible to use esters or amides of (meth)acrylic acid with amino alcohols such as 2-aminoethanol, 2-(methylamino)ethanol, 3-amino-1-propanol, 1-amino-2-propanol or 2-(2-aminoethoxy)ethanol, for example, 2-mercaptoethanol or polyaminoalkanes, such as ethylenediamine or diethylenetriamine, or vinylacetic acid.

Also suitable, furthermore, albeit less preferably, are unsaturated polyetherols or polyesterols or polyacrylate polyols having an average OH functionality of 2 to 10.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl(meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono(meth)acrylate, glycerol mono(meth)acrylate and di(meth)acrylate, trimethylolpropane mono(meth)acrylate and di(meth)acrylate, pentaerythritol mono(meth)acrylate, di(meth)acrylate, and tri(meth)acrylate, and also 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypro-pyl(meth)acrylamide, or 3-hydroxypropyl(meth)acrylamide. Particularly preferred are 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and also the monoacrylates of polyethylene glycol with a molar mass of 106 to 238.

In one preferred embodiment, component (b) may also comprise technical mixtures from the acrylation of trimethylolpropane, pentaerythritol, ditrimethylolpropane or dipentaerythritol, or alkoxylated, preferably propoxylated and/or ethoxylated, more preferably ethoxylated, trimethylolpropane, pentaerythritol, ditrimethylolpropane or dipentaerythritol. These are mostly mixtures of completely and incompletely acrylated polyols; for example, compounds (b) are technical mixtures from the acrylation of pentaerythritol that usually have an OH number to DIN 53240 of 99 to 115 mg KOH/g and consist predominantly of pentaerythritol triacrylate and pentaerythritol tetraacrylate, and may also contain minor amounts of pentaerythritol diacrylate. This has the advantage that pentaerythritol tetraacrylate is not incorporated into the polyurethane of the invention, but instead functions simultaneously as a reactive diluent.

Component (c) is at least one photoinitiator having at least one isocyanate-reactive group, preferably at least one photoinitiator of the α-hydroxyacetophenone type or benzophenone type, in each case having at least one isocyanate-reactive group, and more preferably at least one photoinitiator of the α-hydroxyacetophenone type.

A photoinitiator for the purposes of this specification is a compound which can be cleaved into at least one radical by electromagnetic radiation, preferably by UV radiation, visible light or IR radiation, more preferably by UV radiation or visible light, and very preferably by UV radiation.

Component (c) may comprise one or more than one—for example, 1 to 3, preferably 1 to 2, and more preferably precisely one—group which is active as a photoinitiator, preferably α-hydroxyacetophenone group or benzophenone group, more preferably α-hydroxyacetophenone group. Moreover, component (c) may comprise one or more than one—for example, 1 to 4, preferably 1 to 3, more preferably 1 to 2 and very preferably precisely one—isocyanate-reactive group.

The groups which are active as photoinitiators may preferably be hydroxybenzophenones or hydroxyacetophenones, and more preferably hydroxyacetophenones.

Preferred components (c) are

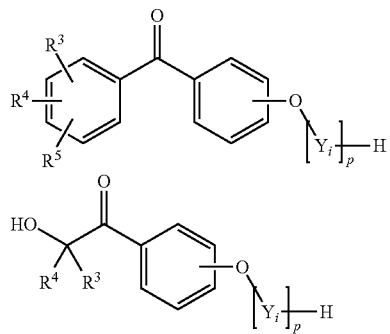

in which
$R^3$, $R^4$, and $R^5$ each independently of one another are hydrogen, an alkyl group containing 1 to 4 carbon atoms or an alkyloxy group containing 1 to 4 carbon atoms,
p may be 0 (zero) or an integer from 1 to 10, and
$Y_i$ for i=1 to p independently of one another may be selected from the group of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, preferably from the group of —CH$_2$—CH$_2$—O—, —CH$_2$—CH(CH$_3$)—O—, and —CH(CH$_3$)—CH$_2$—O—, and more preferably —CH$_2$—CH$_2$—O—.

The group —O—[—$Y_i$—]$_P$—H is preferably located in para-position to the carbonyl group.

The radicals $R^3$, $R^4$, and $R^5$ independently of one another are preferably hydrogen or methyl, more preferably hydrogen.

Preferably p is 0 to 4, more preferably it is 1 to 3, and very preferably it is 1.

Preferred components (c) are 2-hydroxy-2-methyl-1-phenyl-propan-1-one, 1-hydroxycyclohexyl phenyl ketone, 1-[4-(2-hydroxyethoxy)phenyl]-2-hydroxy-2-methyl-1-propan-1-one, 2-hydroxy-1-{4-[4-(2-hydroxy-2-methylpropionyl) benzyl]phenyl}-2-methylpropan-1-one, 2-hydroxy-1-[4-[hydroxy[4-(2-hydroxy-2-methyl-propanoyl)phenyl] methyl]phenyl]-2-methyl-propan-1-one, [4-[3-(4-benzoylphenoxy)-2-hydroxypropoxy]phenyl] phenylmethanone, benzoin, benzoin isobutyl ether, benzoin tetrahydropyranyl ether, benzoin methyl ether, benzoin ethyl ether, benzoin butyl ether, benzoin isopropyl ether, 7H-benzoin methyl ether, 2-hydroxy-2,2-dimethylacetophenone, or 1-hydroxyacetophenone.

Particularly preferred are 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methyl-propan-1-one, and 2-hydroxy-1-[4-[hydroxy-[4-(2-hydroxy-2-methylpropanoyl)phenyl]-methyl]phenyl]-2-methylpropan-1-one; especially preferred is 1-[4-(2-hydroxy-ethoxy)phenyl]-2-hydroxy-2-methyl-1-propan-1-one.

The optional component (d) comprises at least one further diisocyanate and/or polyisocyanate which is different from the compound (a). Also possible in this context are the aforementioned diisocyanates, i.e., compounds with a functionality of 2.

Suitable components (d) are, for example, aliphatic, aromatic, and cycloaliphatic diisocyanates and polyisocyanates having an NCO functionality of at least 2, preferably 2 to 5, and more preferably more than 2 to 4.

Polyisocyanates contemplated include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyantes of linear or branched $C_4$-$C_{20}$ alkylene diisocyanates, cycloaliphatic diisocyanates having a total of 6 to 20 C atoms, or aromatic diisocyanates having a total of 8 to 20 C atoms, or mixtures thereof. Isocyanurates, biurets, and allophanates are preferred, isocyanurates and allophanates are more preferred, and allophanates are very preferred.

The polyisocyanates are preferably polyisocyanates based on one or more diisocyanates having 4 to 20 C atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl) methane, 1-isocyanato-3,3,5-trimethyl-5-(isocyanatomethyl)cyclohexane (isophorone diisocyanate), 1,3- or 1,4-bis (isocyanatomethyl)cyclohexane or 2,4- or 2,6-diisocyanato-1-methylcyclohexane, and also aromatic diisocyanates such as tolylene 2,4- or 2,6-diisocyanate and the isomer mixtures thereof, m- or p-xylylene diisocyanate, 2,4'- or 4,4'-diisocyanato-diphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of the stated diisocyanates may also be present.

Preference is given to hexamethylene diisocyanate, 1,3-bis (isocyanatomethyl)cyclohexane, isophorone diisocyanate, and di(isocyanatocyclohexyl)methane; hexamethylene diisocyanate is particularly preferred.

The polyisocyanates which can be used preferably have an isocyanate group content (calculated as NCO, molecular weight=42) of 10% to 60% by weight, based on the diisocyanate and the polyisocyanate (mixture), preferably 15% to 60% by weight, and more preferably 20% to 55% by weight.

The polyisocyanates are preferably synthesized from aliphatic and/or cycloaliphatic polyisocyanates, examples being the abovementioned aliphatic or cycloaliphatic diisocyanates, respectively, or mixtures thereof.

Contemplated as component (e) are compounds which have at least two isocyanate-reactive groups, examples being —OH, —SH, —NH$_2$ or —NHR$^2$, in which R$^2$ therein, independently of one another, may be hydrogen, methyl, ethyl, isopropyl, n-propyl, n-butyl, isobutyl, sec-butyl or tert-butyl.

Compounds (e) having precisely 2 isocyanate-reactive groups are preferably diols having 2 to 20 carbon atoms, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3-, or 1,4-cyclohexanediol, polyTHF having a molar mass of between 162 and 2000, poly-1,2-propanediol or poly-1,3-propanediol having a molar mass of between 134 and 1178 or polyethylene glycol having a molar mass of between 106 and 2000, and also aliphatic diamines, such as methylene- and isopropylidene-bis(cyclohexylamine), piperazine, 1,2-, 1,3- or 1,4-diaminocyclohexane, 1,2-, 1,3-, or 1,4-cyclohexanebis(methylamine), etc., dithiols or polyfunctional alcohols, secondary or primary amino alcohols, such as ethanolamine, monopropanolamine, etc. or thio alcohols, such as thioethylene glycol.

Particularly suitable here are the cycloaliphatic diols, such as, for example, bis(4-hydroxycyclohexane)isopropylidene, tetramethylcyclobutanediol, 1,2-, 1,3-, or 1,4-cyclohexanediol, 1,1-, 1,2-, 1,3-, and 1,4-cyclohexanedimethanol, cyclooctanediol or norbornanediol.

Further compounds (e) may be compounds having at least three isocyanate-reactive groups.

For example, these components may have 3 to 6, preferably 3 to 5, more preferably 3 to 4, and very preferably 3 isocyanate-reactive groups.

The molecular weight of these components is generally not more than 2000 g/mol, preferably not more than 1500 g/mol, more preferably not more than 1000 g/mol, and very preferably not more than 500 g/mol.

These are preferably polyols having 2 to 20 carbon atoms, examples being trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, and isomalt; particularly preferred are trimethylolpropane, pentaerythritol, and glycerol; and especially preferred is trimethylolpropane.

Optional components (f) are those having optionally at least one compound with precisely one isocyanate-reactive group. In one preferred embodiment there is at least one component (f) present.

In that case the components are preferably monools, more preferably alkanols, and very preferably alkanols having 1 to 20, preferably 1 to 12, more preferably 1 to 6, very preferably 1 to 4, and more particularly 1 to 2 carbon atoms.

Examples thereof are methanol, ethanol, isopropanol, n-propanol, n-butanol, isobutanol, sec-butanol, tert-butanol, n-hexanol, n-heptanol, n-octanol, n-decanol, isodecanol isomer mixtures, undecanol, n-dodecanol (lauryl alcohol), isotridecanol isomer mixtures, n-tridecanol, tetradecanol, pentadecanol, hexadecanol, heptadecanol, octadecanol, nonadecanol, eicosanol, 2-ethylhexanol, cyclopentanol, cyclohexanol, cyclooctanol, cyclododecanol, ethylene glycol monomethyl ether, ethylene glycol monoethyl ether, diethylene glycol, 1,3-propanediol monomethyl ether; preferred are methanol, ethanol, isopropanol, n-propanol, n-butanol, tert-butanol, n-hexanol, 2-ethylhexanol, cyclopentanol, cyclohexanol, and cyclododecanol; particularly preferred are methanol, ethanol, isopropanol, n-propanol, n-butanol, and tert-butanol; especially preferred are n-propanol and ethanol; and ethanol more particularly.

In one less preferred but possible embodiment it is possible for the monools to be the stated cycloaliphatic alcohols, preferably cyclopentanol or cyclohexanol, more preferably cyclohexanol.

In a further preferred embodiment the monools may be the stated aliphatic alcohols having 6 to 20 carbon atoms, more preferably those having 8 to 20 carbon atoms, very preferably those having 10 to 20 carbon atoms.

In one particularly preferred embodiment the monools are the stated aliphatic alcohols, very preferably those having 1 to 4 carbon atoms, more particularly ethanol.

In one alternative further particularly preferred embodiment the monools are alkoxylated aliphatic alcohols of the formula

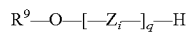

in which
R$^9$ is an alkyl radical having 1 to 20 carbon atoms, preferably 10 to 20 carbon atoms,
q is a positive integer from 1 to 15, preferably 1 to 10, and
Z$_i$ for i=1 to q independently of one another may be selected from the group of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, preferably from the group of —CH$_2$—CH$_2$—O—, —CH$_2$—CH(CH$_3$)—O—, and —CH(CH$_3$)—CH$_2$—O—, and more preferably —CH$_2$—CH$_2$—O—.

When alkoxylated aliphatic alcohols of this kind are used as component (f) in the polyurethanes (A) of the invention, the polyurethanes (A) thus obtainable, in addition to their otherwise positive properties, exhibit improved dispersion of pigments in the inks and printing-inks of the invention, allowing an increased color density in the print.

The polyurethanes which can be used in accordance with the invention are obtained by reacting the components (a), (b), and (c), and also, optionally (d) and/or (e) and/or (f), with one another.

In this case the molar composition (a):(b):(c):(d):(e):(f) per mole of reactive isocyanate groups in (a) and (d) together is generally as follows:
(b) 1-50, preferably 5-40, more preferably 10-37.5, and more particularly 15-33 mol % of isocyanate-reactive groups,
(c) 1-50, preferably 5-40, more preferably 10-37.5, and more particularly 15-33 mol % of isocyanate-reactive groups,
(e) 0-50, preferably 0-30, more preferably 0-25, and more particularly 0-20, and especially 0 mol % of isocyanate-reactive groups, (f) 0-5, preferably 0.1-3, and more preferably 0.2-2 mol % of isocyanate-reactive groups, with the proviso that the sum total of the isocyanate-reactive groups corresponds to the number of isocyanate groups in (a) and (d) where the latter have not been consumed by reaction with other isocyanate groups to form oligomeric polyisocyanates, as for example to form dimers or trimers. The fraction of isocyanate groups from (d) as a proportion of the sum total of the isocyanate groups in (a) and (d) may for example be up to 50%, preferably up to 25%, more preferably up to 10%, and very preferably 0—i.e., there is no compound (d) present.

In the preferred embodiment in which the polyurethane (A) of the invention is prepared using a polyisocyanate of the formula (I) containing allophanate groups, this polyisocyanate already being an adduct of components (a) and (b), the molar composition per reactive isocyanate groups in the compound of the formula (I) is as follows:

(b) 0 to 30 mol %, preferably 0 to 20, more preferably 0 to 10, and very preferably 0 mol % of isocyanate-reactive groups,
(c) 50 to 100 mol %, preferably 60 to 90, and more preferably 60 to 80 mol % of isocyanate-reactive groups,
(d) 0 to 30 mol %, preferably 0 to 20, more preferably 0 to 10, and very preferably 0 mol % of isocyanate groups,
(e) 0 to 20 mol %, preferably 0 to 10, more preferably 0 to 50, and very preferably 0 mol % of isocyanate-reactive groups,
(f) 0-20, preferably 0.1-20, and more preferably 0.2-20 mol % of isocyanate-reactive groups, with the proviso that the sum total of isocyanate-reactive groups corresponds to the sum total of isocyanate groups.

The formation of the adduct of compound containing isocyanate groups and the compound which contains groups that are reactive toward isocyanate groups is generally accomplished by mixing the components in any order, optionally at elevated temperature.

It is preferred here to add the compound containing groups that are reactive toward isocyanate groups to the compound containing isocyanate groups, preferably in two or more steps.

With particular preference, the compound (a), and also optionally (d), containing isocyanate groups is introduced initially and the compounds which contain isocyanate-reactive groups are added. More particularly, the compound (a) containing isocyanate groups is introduced initially, and then (b) and/or (c) preferably (b), are/is added. After that any desired further components may be added.

Generally speaking, the reaction is carried out at temperatures between 5 and 100° C., preferably between 20 to 90° C., and more preferably between 40 and 80° C., and more particularly between 60 and 80° C.

The process of the invention is carried out in the presence of less than 1000 ppm by weight, preferably less than 500, more preferably less than 250 and very preferably less than 100 ppm by weight of a bismuth-, zinc- and/or titanium-containing compound, preferably of a bismuth- and/or titanium-containing compound, and more preferably of a bismuth-containing compound.

Zinc and bismuth compounds contemplated are those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-1}O_4)^{2-}$, where n stands for the numbers 1 to 20. Preference here is given to the carboxylates in which the anion conforms to the formulae $(C_nH_{2n-1}O_2)^-$ and also $(C_{n+1}H_{2n-2}O_4)^{2-}$ with n being 1 to 20. Particularly preferred salts have monocarboxylate anions of the general formula $(C_nH_{2n-1}O_2)^-$ where n stands for the numbers 1 to 20. Particularly noteworthy in this context are formate, acetate, propionate, hexanoate, neodecanoate, and 2-ethylhexanoate.

Among the zinc catalysts the zinc carboxylates are preferred, more preferably those of carboxylates which have at least six carbon atoms, very preferably at least eight carbon atoms, more particularly zinc(II) diacetate or zinc(II) dioctoate or zinc(II) neodecanoate. Commercial catalysts are, for example, Borchi® Kat 22 from OMG Borchers GmbH, Langenfeld, Germany.

Among the bismuth catalysts the bismuth carboxylates are preferred, more preferably those of carboxylates which have at least six carbon atoms, more particularly bismuth octoates, ethylhexanoates, neodecanoates, or pivalates; examples are K-KAT 348, XC-B221; XC-C227, XC 8203, and XK-601 from King Industries, TIB KAT 716, 716LA, 716XLA, 718, 720, and 789 from TIB Chemicals, and those from Shepherd Lausanne, and also, for example, Borchi® Kat 24; 315; 320 from OMG Borchers GmbH, Langenfeld, Germany.

The catalysts may also comprise mixtures of different metals, as for example in Borchi® Kat 0245 from OMG Borchers GmbH, Langenfeld, Germany.

Among the titanium compounds the titanium tetra-alcoholates $Ti(OR)_4$ are preferred, more preferably those of alcohols ROH having 1 to 8 carbon atoms, examples being methanol, ethanol, isopropanol, n-propanol, n-butanol, isobutanol, sec-butanol, tert-butanol, n-hexanol, n-heptanol, n-octanol; preferably methanol, ethanol, isopropanol, n-propanol, n-butanol, tert-butanol; more preferably isopropanol and n-butanol.

In the process of the invention operation takes place under water-free conditions. Water-free here means that the water content in the reaction system is not more than 5% by weight, preferably not more than 3% by weight, and more preferably not more than 1% by weight, very preferably not more than 0.75%, and more particularly not more than 0.5% by weight. If operation is not water-free, the risk exists of water reacting with the free isocyanate groups under the reaction conditions, and of the amino groups which form causing secondary reaction, as for example a Michael addition to (meth)acrylate groups, or reaction with further free isocyanate groups to form low-solubility biurets.

The reaction is carried out preferably in the presence of at least one oxygen-containing gas, examples being air or air/nitrogen mixtures, or mixtures of oxygen or an oxygen-containing gas with a gas which is inert under the reaction conditions, such mixtures having an oxygen content of below 15%, preferably below 12%, more preferably below 10%, very preferably below 8%, and more particularly below 6% by volume.

In one preferred embodiment the reaction mixture is admixed with up to 1000 ppm by weight of at least one process stabilizer. Preferred process stabilizers are phenothiazine, 2,2,6,6-tetramethylpiperidine-N-oxyl, and also quinone methides.

In one preferred embodiment the reaction of the compound (a) containing isocyanate groups, or of the reaction product of (a) and (b), with the compound (c) is carried out such that the compound containing isocyanate groups is used in an excess of NCO groups, relative to the isocyanate-reactive groups in (c), of at least 20 mol %. A consequence of this is that the compounds (c) are incorporated substantially completely by reaction. The excess of isocyanate groups can be reacted subsequently with further compound (b) and/or compound (f), preferably with compound (f).

The reaction can also be carried out in the presence of an inert solvent, an example being acetone, isobutyl methyl ketone, toluene, xylene, butyl acetate, methoxypropyl acetate, or ethoxyethyl acetate. Preferably, however, the reaction is carried out in the absence of a solvent.

In one preferred embodiment the reaction of (a) with (b) and/or (c), preferably (a) and (b), is carried out under allophanatization conditions. By these are meant reaction conditions under which allophanate groups are formed at least in part, preferably reaction conditions under which, among various competing reactions of the isocyanate groups, more isocyanate groups are consumed by reaction to form allophanate groups than to form other reaction products.

In a further preferred embodiment, compounds used are of the kind described in WO 00/39183, page 4, line 3 to page 10, line 19, the disclosure content of which is hereby part of the present specification. Particularly preferred among these are those compounds which as synthesis components have at least one (cyclo)aliphatic isocyanate containing allophanate groups, and at least one hydroxylalkyl(meth)acrylate—very preferably the products 1 to 9 in table 1 on page 24 of WO 00/39183. With very particular preference the compounds in question are those polyisocyanates of the formula (I) described above.

Further provided with the present invention are formulations of incorporable photoinitiators, consisting of at least one polyurethane A comprising as synthesis components
(a) at least one organic aliphatic, aromatic or cycloaliphatic diisocyanate or polyisocyanate having a functionality of more than 2,
(b) at least one compound having in each case at least one isocyanate-reactive group and at least one radically polymerizable unsaturated group,
(c) at least one photoinitiator having at least one isocyanate-reactive group,
(d) optionally at least one further diisocyanate and/or polyisocyanate, which is different from the compound (a),
(e) optionally at least one compound having at least two isocyanate-reactive groups,
(f) optionally at least one compound having precisely one isocyanate-reactive group, optionally at least one polyfunctional polymerizable compound (B),
and also 0.5% to 4% by weight of water, based on the amount of polyurethane (A).

The amount of water is preferably at least 0.75% by weight, more preferably at least 1% by weight, very preferably at least 1.25% by weight and more particularly at least 1.5% by weight, based on the amount of polyurethane (A).

The amount of water is preferably up to 3.5% by weight, more preferably up to 3% by weight, based on the amount of polyurethane (A).

These formulations are generally stable in storage and do not undergo separation.

An advantage of these formulations is that by admixing of the stated amount of water it is possible to reduce the viscosity of the polyurethane (A). Generally speaking the viscosity, measured to DIN EN ISO 3219 (shear rate D, 100 s$^{-1}$) at 23° C., is not more than 400 Pas, and so the formulation is fluid. The viscosity is preferably less than 300, more preferably less than 250 Pas, and very preferably less than 200 Pas.

The formulation may take the form of a solution or dispersion, preferably a solution of water in the polyurethane (A). For mixing, the amount of water is introduced, optionally in portions, into the polyurethane (A), with introduction of energy. It is also possible, however, for the polyurethane (A) to be added to water.

Mixing may take place, for example, by stirring, static mixers, or ultrasound; preferably by stirring.

The polyurethanes (A) and the formulations of incorporable photoinitiators of the invention can be used preferably in inks, printing-inks, and print varnishes of the invention.

The present invention further provides inks, printing-inks and print varnishes comprising
at least one polyurethane A comprising as synthesis components
(a) at least one organic aliphatic, aromatic or cycloaliphatic diisocyanate or polyisocyanate having a functionality of more than 2,
(b) at least one compound having in each case at least one isocyanate-reactive group and at least one radically polymerizable unsaturated group,
(c) at least one photoinitiator having at least one isocyanate-reactive group,
(d) optionally at least one further diisocyanate and/or polyisocyanate, which is different from the compound (a),
(e) optionally at least one compound having at least two isocyanate-reactive groups,
(f) optionally at least one compound having precisely one isocyanate-reactive group,
and also, in addition to the polyurethane (A),
0.5 to 4% by weight of water, based on the amount of polyurethane (A),
optionally at least one pigment,
at least one polyfunctional polymerizable compound (B),
optionally at least one further photoinitiator, and also
optionally additives typical of printing-inks.

The print varnishes of the invention contain no pigments.

The at least one further photoinitiator is preferably present in the case of pigmented printing-inks and in the case of print varnishes.

The term "printing-ink" is used in this specification as a collective designation for colorant-containing preparations with a variety of consistencies, these preparations being applied exclusively by means of a printing form to a print-receiving medium, where they are fixed in the form of a colored film (print) (CEPE definition).

The term "ink" in this specification is used exclusively for colored liquids for ink-jet liquid and also for liquid toners for electrophotographic printing processes.

The inks, printing-inks, and print varnishes of the invention can be used for printing a variety of substrates, preferably polyamides, polyethylene, polypropylene, polyesters, polyethylene terephthalate, polystyrene, paper, paperboard, cardboard, plastics-coated paper, plastics-coated paperboard or plastics-coated cardboard, aluminum, and aluminum-coated polymeric films, preferably polyethylene, polypropylene, and polyesters, and also paper and cardboard.

Where paper, paperboard or cardboard is plastics-coated, the plastic in question preferably comprises polyolefins, more preferably polyethylene or polypropylene.

The substrates thus printed are especially suitable as packaging materials for food and drink, cosmetics, and pharmaceuticals.

The polyurethanes (A) of the invention may be used as sole binder or, preferably, in combination with at least one further radically polymerizable compound.

Radically polymerizable groups are, for example, preferably (meth)acrylate groups and more preferably acrylate groups.

The radically polymerizable compounds (B) are preferably polyfunctional (compound having more than one radically polymerizable double bond) polymerizable compounds.

(Meth)acrylic acid stands in this specification for methacrylic acid and acrylic acid, preferably for acrylic acid.

Multifunctional polymerizable compounds are preferably multifunctional (meth)acrylates which carry at least 2, preferably 2-10, more preferably 3-6, and very preferably 3-4 (meth)acrylate groups, preferably acrylate groups.

Examples of multifunctional polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3- or 1,4-cyclohexanediol diacrylate, dipropylene glycol diacrylate trimethylolpropane triacrylate, ditrimethylolpropane tipropylene glycol diacrylate penta- or hexaacrylate, pentaerythritol tri- or tetraacrylate, glycerol di- or triacrylate, and also di- and polyacrylates of sugar alcohols, such as sorbitol, mannitol, diglycerol, threitol, erythritol, adonitol (ribitol), arabitol (lyxitol), xylitol, dulcitol (galactitol), maltitol or isomalt, or of polyester polyols, polyetherols, poly THF having a molar mass of between 162 and 2000, poly-1,3-propanediol having a molar mass of between 134 and 1178, polyethylene glycol having a molar mass of between 106 and 898, and also epoxy tetraacrylate dipentaerythritol(meth)acrylates, polyester(meth)acrylates, polyether(meth)acrylates, urethane (meth)acrylates or polycarbonate(meth)acrylates, which optionally may also have been modified with one or more amines.

Further examples are (meth)acrylates of compounds of formula (VIIIa) to (VIIId)

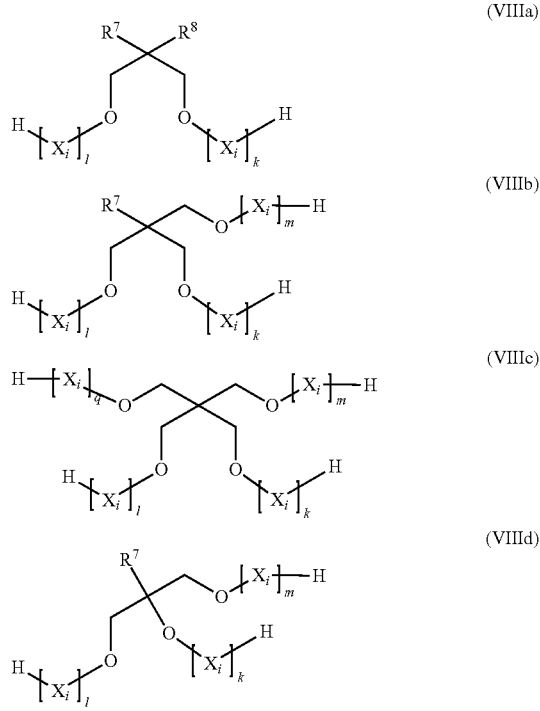

in which
$R^7$ and $R^8$ independently of one another are hydrogen or are $C_1$-$C_{18}$ alkyl which is optionally substituted by aryl, alkyl, aryloxy, alkyloxy, heteroatoms and/or heterocycles, k, l, m, and q independently of one another are each an integer from 1 to 10, preferably 1 to 5, and more preferably 1 to 3, and each $X_i$ for i=1 to k, 1 to l, 1 to m, and 1 to q can be selected independently of one another from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—, in which Ph is phenyl and Vin is vinyl.

$C_1$-$C_{18}$ alkyl therein, optionally substituted by aryl, alkyl, aryloxy, alkyloxy, heteroatoms and/or heterocycles, is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, more preferably methyl or ethyl.

These are preferably (meth)acrylates of singly to vigintuply and more preferably triply to decuply ethoxylated, propoxylated or mixedly ethoxylated and propoxylated, and in particular exclusively ethoxylated, neopentyl glycol, trimethylolpropane, trimethylolethane or pentaerythritol.

Preferred multifunctional polymerizable compounds are 1,2-propanediol diacrylate, 1,3-propanediol diacrylate, dipropylene glycol diacrylate, tripropylene glycol diacrylate, trimethylolpropane triacrylate, ditrimethylol tetracrylate, and dipentaerythritol hexaacrylate, polyester polyol acrylates, polyetherol acrylates, and triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol.

In one preferred embodiment, epoxy(meth)acrylates are used as multifunctional polymerizable compounds in print varnishes.

Especially preferred multifunctional polymerizable compounds are trimethylolpropane triacrylate and triacrylate of singly to vigintuply ethoxylated trimethylolpropane, triacrylate of singly to vigintuply propoxylated glycerol or tetraacrylate of singly to vigintuply ethoxylated and/or propoxylated pentaerythritol.

Further constituents may also be polyalcohols with full or partial esterification with (meth)acrylic acid.

Examples of such polyalcohols are at least divalent polyols, polyetherols or polyesterols, or polyacrylate polyols, having an average OH functionality of at least 2, preferably at least 3, more preferably at least 4, and very preferably 4 to 20.

Polyetherols, in addition to the alkoxylated polyols, may also be polyethylene glycol having a molar mass of between 106 and 2000, polypropylene glycol having a molar weight of between 134 and 2000, polyTHF having a molar weight of between 162 and 2000, or poly-1,3-propanediol having a molar weight of between 134 and 400.

Polyester polyols are known for example from Ullmanns Encyklopädie der technischen Chemie, 4th edition, volume 19, pp. 62 to 65. Preference is given to using polyester polyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic or heterocyclic and may optionally be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyethylene glycol having a molar weight between 106 and 2000, polypropylene glycol having a molar weight between 134 and 2000, polyTHF having a molar mass between 162 and 2000, poly-1,3-propanediol having a molar weight between 134 and 400, neopentyl glycol, neopentyl glycol hydroxypivalate, 2-ethyl-1,3-propanediol, 2-methyl-1,3-propanediol, 2,2-bis (4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which optionally may have been alkoxylated as described above.

Preferred alcohols are those of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

Also suitable are lactone-based polyesterdiols, which are homopolymers or copolymers of lactones, preferably hydroxyl-terminated adducts of lactones with suitable difunctional starter molecules. Suitable lactones include, preferably, those deriving from compounds of the general formula HO—$(CH_2)_z$—COOH, z being a number from 1 to 20 and it being possible for an H atom of a methylene unit also to have been substituted by a $C_1$ to $C_4$ alkyl radical. Examples are ϵ-caprolactone, β-propiolactone, gamma-butyrolactone and/or methyl-ϵ-caprolactone, 4-hydroxybenzoic acid, 6-hydroxy-2-naphthoic acid or pivalolactone, and mixtures thereof. Examples of suitable starter components are the low molecular mass dihydric alcohols specified above as a synthesis component for the polyester polyols. The corresponding polymers of ϵ-caprolactone are particularly preferred. Lower polyesterdiols or polyetherdiols as well can be used as starters for preparing the lactone polymers. In lieu of the polymers of lactones it is also possible to use the corresponding, chemically equivalent polycondensates of the hydroxycarboxylic acids corresponding to the lactones.

Also suitable, furthermore, are polycarbonatediols, such as may be obtained, for example, by reacting phosgene with an excess of the low molecular weight alcohols specified as synthesis components for the polyester polyols.

The multifunctional polymerizable compound, may also comprise urethane(meth)acrylates, epoxy(meth)acrylates or carbonate(meth)acrylates.

Urethane(meth)acrylates are obtainable for example by reacting polyisocyanates with hydroxyalkyl(meth)acrylates and optionally chain extenders such as diols, polyols, diamines, polyamines, dithiols or polythiols. Urethane(meth) acrylates which can be dispersed in water without addition of emulsifiers additionally comprise ionic and/or nonionic hydrophilic groups, which are introduced into the urethane by means of synthesis components such as hydroxycarboxylic acids, for example.

Urethane(meth)acrylates of this kind comprise as synthesis components substantially:

(1) at least one organic aliphatic, aromatic or cycloaliphatic di- or polyisocyanate,
(2) at least one compound having at least one isocyanate-reactive group and at least one radically polymerizable unsaturated group, and
(3) optionally, at least one compound having at least two isocyanate-reactive groups.

Possible useful components (1), (2), and (3) may be the same as those described above as synthesis components (a), (b), and (e) for the polyurethanes of the invention.

The urethane(meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane(meth)acrylates preferably have a (meth) acrylic group content of 1 to 5, more preferably of 2 to 4, mol per 1000 g of urethane(meth)acrylate.

Epoxy(meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy(meth)acrylates preferably have a number-average molar weight $M_n$ of 200 to 20 000, more preferably of 200 to 10 000 g/mol, and very preferably of 250 to 3000 g/mol; the amount of (meth)acrylic groups is preferably 1 to 5, more preferably 2 to 4, per 1000 g of epoxy(meth)acrylate (determined by gel permeation chromatography using polystyrene as standard and tetrahydrofuran as eluent).

Carbonate(meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate(meth)acrylates are obtainable in a simple manner by transesterifying carbonic esters with polyhydric, preferably dihydric, alcohols (diols, hexanediol for example) and subsequently esterifying the free OH groups with (meth) acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl(meth)acrylate, 2- or 3-hydroxypropyl (meth)acrylate, 1,4-butanediol mono(meth)acrylate, neopentyl glycol mono(meth)acrylate, glyceryl mono- and di(meth) acrylate, trimethylolpropane mono- and di(meth)acrylate, and pentaerythritol mono-, di-, and tri(meth)acrylate.

Particularly preferred carbonate(meth)acrylates are those of the formula:

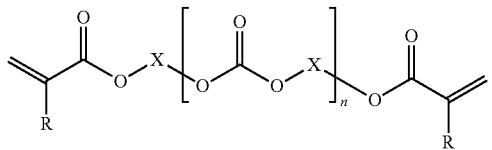

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate(meth)acrylates are preferably aliphatic carbonate(meth)acrylates.

Among the multifunctional polymerizable compounds, urethane(meth)acrylates are particularly preferred.

It may be useful to add photoinitiator—preferably photoinitiator with a different absorption maximum from component (c)—, in addition to the polyurethane (A), to the inks, printing-inks, and print varnishes of the invention.

Photoinitiators may be, for example, photoinitiators known to the skilled person, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from BASF SE), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chloro-benzophenone, Michler's ketone, 1-acetonaphthone, 2-acetonaphthone, 1-benzoyl-cyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, 2-hydroxy-1-[4-[[4-(2-hydroxy-2-methylpropanoyl)phenyl]methyl]phenyl]-2-methylpropan-1-one, 2-benzyl-2-dimethylamino-4'-morpholinobutyrophenone, 2-(dimethylamino)-1-(4-morpholinophenyl)-2-(p-tolylmethyl)butan-1-one, 2-methyl-1-(4-methylthiophenyl)-2-morpholinopropan-1-one, triphenylphosphine, tri-o-tolylphosphine, benz[a]anthracene-7,12-dione, 2,2-diethoxyacetophenone, benzil ketals, such as benzil dimethyl ketal, anthraquinones such as 2-methylanthraquinone, 2-ethylanthraquinone, 2-tert-butylanthraquinone, 1-chloroanthraquinone, and 2-amylanthraquinone, and 2,3-butanedione.

Likewise conceivable as photoinitiators are polymeric photoinitiators such as, for example, the diester of carboxymethoxybenzophenone with polytetramethylene glycols of different molar weights, preferably 200 to 250 g/mol (CAS 515136-48-8), and also CAS 1246194-73-9, CAS 813452-37-8, CAS 71512-90-8, CAS 886463-10-1, or further polymeric benzophenone derivatives, of the kind available commercially, for example, under the trade name Omnipol® BP from IGM Resins B.V., Waalwijk, The Netherlands, or Genopol® BP1 from Rahn AG, Switzerland. Also conceivable, furthermore, are polymeric thioxanthones, examples being the diesters of carboxymethoxythioxanthones with polytetramethylene glycols of various molar weights, of the kind available commercially, for example, under the trade name Omnipol® TX from IGM Resins B.V., Waalwijk, The Netherlands. Also conceivable, furthermore, are polymeric α-amino ketones, examples being the diester of carboxyethoxythioxanthones with polyethylene glycols of various molar weights, of the kind available commercially, for example, under the trade name Omnipol® 910 or Omnipol® 9210 from IGM Resins B.V., Waalwijk, The Netherlands.

One preferred embodiment uses, as photoinitiators, silsesquioxane compounds having at least one initiating group, of the kind described in WO 2010/063612 A1, particularly from page 2, line 21 to page 43, line 9 therein, hereby incorporated by reference as part of the present disclosure content, preferably from page 2, line 21 to page 30, line 5, and also the compounds described in the examples of WO 2010/063612 A1.

Also suitable are nonyellowing or low-yellowing photoinitiators of the phenylglyoxalic ester type, such as silsesquioxane compounds described in DE-A 198 26 712, DE-A 199 13 353 or WO 98/33761.

Preference among these photoinitiators is given to 2,4,6-trimethylbenzoyldiphenylphosphine oxide, ethyl 2,4,6-trimethylbenzoylphenylphosphinate, bis(2,4,6-tri-methylbenzoyl)phenylphosphine oxide, 2-benzyl-2-dimethylamino-4'-morpholinobutyrophenone, 2-(dimethylamino)-1-(4-morpholinophenyl)-2-(p-tolylmethyl)butan-1-one, 2-hydroxy-1-[4-[[4-(2-hydroxy-2-methyl-propanoyl)phenyl]methyl]phenyl]-2-methylpropan-1-one, and also the above-described polymeric thioxanthone and benzophenone derivatives, and also those described in WO 2010/063612 A1.

As further additives typical for printing-inks it is possible for example to use dispersants, waxes, stabilizers, sensitizers, fillers, defoamers, colorants, antistatic agents, thickeners, surface-active agents such as flow control agents, slip aids or adhesion promoters.

Suitable fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Recited below are examples of particularly suitable pigments.

Organic Pigments:
  Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;
  Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;
  Anthanthrone pigments: C.I. Pigment Red 168 (C.I. Vat Orange 3);
  Anthraquinone pigments: C.I. Pigment Yellow 147 and 177; C.I. Pigment Violet 31;
  Anthraquinone pigments: C.I. Pigment Yellow 147 and 177; C.I. Pigment Violet 31;
  Anthrapyrimidine pigments: C.I. Pigment Yellow 108 (C.I. Vat Yellow 20);
  Quinacridone pigments: C.I. Pigment Red 122, 202 and 206; C.I. Pigment Violet 19;
  Quinophthalone pigments: C.I. Pigment Yellow 138;
  Dioxazine pigments: C.I. Pigment Violet 23 and 37;
  Flavanthrone pigments: C.I. Pigment Yellow 24 (C.I. Vat Yellow 1);
  Indanthrone pigments: C.I. Pigment Blue 60 (C.I. Vat Blue 4) and 64 (C.I. Vat Blue 6);
  Isoindoline pigments: C.I. Pigment Orange 69; C.I. Pigment Red 260; C.I. Pigment Yellow 139 and 185;
  Isoindolinone pigments: C.I. Pigment Orange 61; C.I. Pigment Red 257 and 260; C.I. Pigment Yellow 109, 110, 173 and 185;
  Isoviolanthrone pigments: C.I. Pigment Violet 31 (C.I. Vat Violet 1);
  Metal complex pigments: C.I. Pigment Yellow 117, 150 and 153; C.I. Pigment Green 8;
  Perinone pigments: C.I. Pigment Orange 43 (C.I. Vat Orange 7); C.I. Pigment Red 194 (C.I. Vat Red 15);
  Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
  Phthalocyanine pigments: C.I. Pigment Blue 15, 15:1, 15:2, 15:3, 15:4, 15:6 and 16; C.I. Pigment Green 7 and 36;
  Pyranthrone pigments: C.I. Pigment Orange 51; C.I. Pigment Red 216 (C.I. Vat Orange 4);
  Thioindigo pigments: C.I. Pigment Red 88 and 181 (C.I. Vat Red 1); C.I. Pigment Violet 38 (C.I. Vat Violet 3);
  Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);
C.I. Pigment Yellow 101 (aldazine yellow);
C.I. Pigment Brown 22.
Inorganic Pigments:
  White pigments: titanium dioxide (C.I. Pigment White 6), zinc white, pigmented zinc oxide, barium sulfate, zinc sulfide, lithopones; lead white; calcium carbonate;
  Black pigments: iron oxide black (C.I. Pigment Black 11), iron-manganese black, spinel black (C.I. Pigment Black 27); carbon black (C.I. Pigment Black 7);
  Color pigments: chromium oxide, chromium oxide hydrate green; chromium green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; iron oxide red (C.I. Pigment Red 101); cadmium sulfoselenide (C.I. Pigment Red 108); molybdate red (C.I. Pigment Red 104); ultramarine red;
Iron oxide brown, mixed brown, spinel and corundum phases (C.I. Pigment Brown 24, 29 and 31), chromium orange;
Iron oxide yellow (C.I. Pigment Yellow 42); nickel titanium yellow (C.I. Pigment Yellow 53; C.I. Pigment Yellow 157 and 164); chromium titanium yellow; cadmium sulfide and cadmium zinc sulfide (C.I. Pigment Yellow 37 and 35); chromium yellow (C.I. Pigment Yellow 34), zinc yellow, alkaline earth metal chromates; Naples yellow; bismuth vanadate (C.I. Pigment Yellow 184);
  Interference pigments: metallic effect pigments based on coated metal platelets; pearlescent pigments based on metal oxide coated mica platelets; liquid crystal pigments.

Preferred pigments (B) in this context are monoazo pigments (especially laked BONS pigments, Naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments, white pigments, and carbon blacks.

Examples of particularly preferred pigments (B) are specifically: carbon black, titanium dioxide, C.I. Pigment Yellow 138, C.I. Pigment Red 122 and 146, C.I. Pigment Violet 19, C.I. Pigment Blue 15:3 and 15:4, C.I. Pigment Black 7, C.I. Pigment Orange 5, 38 and 43 and C.I. Pigment Green 7.

Suitable stabilizers comprise typical UV absorbers such as oxanilides, triazines, and benzotriazole (the latter obtainable as Tinuvin® grades from BASF), and benzophenones. They can be employed alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate, or quinone methide (such as Irgastab® UV22). Stabilizers are used usually in amounts of 0.1% to 0.5% by weight of the active ingredient component based on the preparation.

A further aspect of the present invention is a process for printing sheetlike or three-dimensional, preferably sheetlike substrates by any desired printing process, using at least one printing-ink of the invention. In one preferred variant of the printing process of the invention, at least one printing-ink of the invention is printed onto a substrate and then treated with actinic radiation, as for example UV radiation and/or electron beams, preferably UV radiation.

Printing processes in which the printing-inks of the invention can be used are preferably offset printing, letterpress, flexographic printing, gravure printing, screen printing, and inkjet printing, more preferably flexographic and offset printing.

In the so-called mechanical printing processes such as offset printing, letterpress, flexographic printing or gravure printing, the printing-ink is transferred to the print-receiving medium (printing stock) by contact with a printing form or printing plate which is inked with printing-ink. UV-curable printing-inks for these applications typically comprise reactive diluents, binders, colorants, initiators, and also, optionally, various additives. Binders serve to form the ink film and to anchor the constituents, such as pigments or fillers, for example, in the ink film. Depending on consistency, printing-inks for these applications typically comprise between 10% and 60% by weight of binder. Reactive diluents serve to adjust the processing viscosity.

Print varnishes are applied either to the printing stock, as a primer, or to the printing stock after the printing operation, as a coating. Print varnishes are used, for example, for protecting the printed image, for improving the adhesion of the printing-ink to the printing stock, or for esthetic purposes. Application is typically in-line or off-line by means of a varnishing unit on the printing machine.

Print varnishes contain no colorant, but apart from that generally have a similar composition to printing-inks, and are distinguished by the absence of the colorant.

Printing-inks for mechanical printing processes comprise what are called pasty printing-inks of high viscosity for offset printing and for letterpress, and also what are called liquid printing-inks, of comparatively low viscosity, for flexographic and gravure printing.

The inks of the invention can be used for example as ink-jet liquid and also for liquid toners for electrophotographic printing processes.

Optionally, if two or more printed layers of the printing-inks are applied one above another, it is possible for drying and/or radiation curing to take place after each printing operation.

Radiation curing takes place with high-energy light, UV light for example, or electron beams. Radiation curing may also take place at relatively high temperatures.

Examples of suitable radiation sources for the radiation cure are low-pressure mercury lamps, medium-pressure mercury lamps with high-pressure lamps, and fluorescent tubes, pulsed lamps, metal halide lamps, electronic flash units, with the result that radiation curing is possible without a photoinitiator, or excimer lamps and also UV LEDs. The radiation cure is accomplished by exposure to high-energy radiation, i.e., UV radiation, or daylight, preferably light in the wavelength range of $\lambda=200$ to 700 nm, more preferably $\lambda=200$ to 500 nm, and very preferably $\lambda=250$ to 400 nm, or by exposure to high-energy electrons (electron beams; 60 to 300 keV). Examples of radiation sources used include high-pressure mercury vapor lamps, lasers, pulsed lamps (flash light), halogen lamps, UV LEDs, or excimer lamps. The radiation dose normally sufficient for crosslinking in the case of UV curing is in the range from 30 to 3000 mJ/cm$^2$.

It will be appreciated that a number of radiation sources can also be used for the cure: two to four, for example.

These sources may also emit each in different wavelength ranges.

Irradiation can optionally also be carried out in the absence of oxygen, such as under an inert gas atmosphere. Suitable inert gases are preferably nitrogen, noble gases, carbon dioxide, or combustion gases.

It is an advantage of the polyurethanes (A) and of the process of the invention that they can be used to prepare inks, printing-inks, and print varnishes whose levels of extractable and/or migratable constituents are reduced. Since the photoinitiator is incorporated into the polyurethanes of the invention, the degradation products of the photoinitiators as well are additionally fixed in the coating, and so generally have little or no migration capacity. A consequence of this is that with the polyurethanes of the invention, little or no migratable fraction of degradation products of photoinitiators is found, when the resulting coatings are subjected to extraction, for example, by comparison with coatings which require the addition of photoinitiators of low molecular mass—that is, photoinitiators which are not incorporable. By foregoing the use of tin as catalyst in the preparation of the polyurethanes (A), toxicologically objectionable metals are avoided. Moreover, the viscosity of the formulations, inks, printing-inks, and print varnishes of the invention is generally relatively low, since the polyurethanes preferably contain allophanate groups. Moreover, as a result of the fraction of water, it is possible to prepare a low-viscosity formulation, which facilitates incorporation of the polyurethanes (A) into inks, print varnishes, and printing-inks.

ppm and percentage figures used in this specification are by weight unless otherwise indicated.

The examples below are intended to illustrate the invention but not to limit it to these examples.

EXAMPLES

Laromer® LR 8863 of BASF SE, Ludwigshafen, is a commercial triacrylate of trimethylolpropane which has on average 3.5-fold ethoxylation.

Laromer® 9000 from BASF SE, Ludwigshafen, is a commercial polyisocyanate containing allophanate groups, of formula (I) above, in which acrylate groups are bonded via allophanate groups. The NCO content is 14.5% to 15.5% by weight.

Irgacure® 2959 from BASF SE, Ludwigshafen, is a commercial photoinitiator of the α-hydroxy ketone type (1-[4-(2-hydroxyethoxy)phenyl]-2-hydroxy-2-methyl-1-propan-1-one).

Irgastab® UV22 from BASF SE, Ludwigshafen, is a commercial stabilizer comprising quinone methide in solution in an acrylate of propoxylated glycerol.

Example 1

86 parts of a polyether acrylate (Laromer® LR 8863), 120 parts of an isocyanato acrylate (Laromer® LR9000), 79 parts of a photoinitiator (Irgacure® 2959), 0.1 part of Borchi® Kat 24 (bismuth carboxylate), and 0.9 part of a further stabilizer (Irgastab® UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The batch was then cooled, admixed with 3% of water, and discharged.

Example 1a 86 parts of a polyether acrylate (Laromer® LR 8863), 100 parts of an isocyanato acrylate (Laromer® LR9000), 79 parts of a photoinitiator (Irgacure® 2959), 0.1 part of Borchi® Kat 24 (bismuth carboxylate), and 0.9 part of a further stabilizer (Irgastab®UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The batch was then cooled, admixed with 3% of water, and discharged. The GPC spectrum shows that there is still about 6% of unreacted Irgacure® 2959 present.

Comparative Example 1

86 parts of a polyether acrylate (Laromer® LR 8863), 120 parts of an isocyanato acrylate (Laromer® LR9000), and 79 parts of a photoinitiator (Irgacure® 2959), were introduced into a reaction flask and heated to 80° C. Reaction was then continued at 80-85° C. to bring the NCO value to <0.8%. After about 20 hours, the photoinitiator had still not completely reacted. Before the value reached <0.8% (about 12 hours), however, crosslinking occurred.

Comparative example 1 shows that it is necessary to react the free NCO groups with a component (f).

Comparative Example 2

86 parts of a polyether acrylate (Laromer® LR 8863), 120 parts of an isocyanato acrylate (Laromer® LR9000), 79 parts of a photoinitiator (Irgacure® 2959), and 0.9 part of a further stabilizer (Irgastab® UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The batch was then cooled and admixed with 5% of water. The reaction mixture became cloudy.

Comparative example 2 shows that the formulations of the invention turn cloudy if too much water is added.

Example 2

86 parts of a polyether acrylate (Laromer® LR 8863), 120 parts of an isocyanato acrylate (Laromer® LR9000), 79 parts of a photoinitiator (Irgacure® 2959), 50 ppm of Borchi® Kat 24 (bismuth carboxylate), and 0.015 part of a further stabilizer (Irgastab® UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The GPC chromatogram showed complete reaction of the photoinitiator. Then a further part of the UV22 stabilizer was added and the batch was cooled, admixed with 2% of water, and discharged.

Example 3

86 parts of a polyether acrylate (Laromer® LR 8863), 120 parts of an isocyanato acrylate (Laromer® LR9000), 79 parts of a photoinitiator (Irgacure® 2959), 50 ppm of Borchi® Kat 22 (zinc carboxylate), and 0.015 part of a further stabilizer (Irgastab®UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The GPC chromatogram showed complete reaction of the photoinitiator. Then 1.5 further parts of the UV22 stabilizer were added and the batch was cooled, admixed with 2% of water, and discharged.

Example 4

86 parts of a polyether acrylate (Laromer® LR 8863), 120 parts of an isocyanato acrylate (Laromer® LR9000), 79 parts of a photoinitiator (Irgacure® 2959), 50 ppm of tetrabutyl orthotitanate, and 0.015 part of a further stabilizer (Irgastab® UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The GPC chromatogram showed complete reaction of the photoinitiator. Then 1.5 further parts of the UV22 stabilizer were added and the batch was cooled, admixed with 2% of water, and discharged.

Example 5

86 parts of a polyether acrylate (Laromer® LR 8863), 120 parts of an isocyanato acrylate (Laromer® LR9000), 79 parts of a photoinitiator (Irgacure® 2959), 50 ppm of Borchi® Kat 315 (bismuth carboxylate), and 0.015 part of a further stabilizer (Irgastab® UV22) were introduced into a reaction flask and heated to 80° C. They were then reacted at 80-85° C. until the NCO value had dropped to <0.8%, whereupon the equivalent amount of ethanol was added, calculated relative to NCO, and reaction was continued until the NCO value had dropped to 0. The GPC chromatogram showed complete reaction of the photoinitiator. Then 1.5 further parts of the UV22 stabilizer were added and the batch was cooled, admixed with 2% of water, and discharged.

Example 6

86 parts of a polyether acrylate (Laromer® LR 8863), 120 parts of an isocyanato acrylate (Laromer® LR9000), 79 parts of a photoinitiator (Irgacure® 2959), 50 ppm of Borchi® Kat 315 (bismuth carboxylate), and 0.015 part of a further stabilizer (Irgastab® UV22) were introduced into a reaction flask and heated to 80° C. They were then reacted at 80-85° C. until the NCO value had dropped to <0.8%, whereupon the equivalent amount of Lutensol TO3 (C13 alcohol ethoxylate, BASF SE) was added, calculated relative to NCO, and reaction was continued until the NCO value had dropped to 0. The GPC chromatogram showed complete reaction of the photoinitiator. Then 1.5 further parts of the UV22 stabilizer were added and the batch was cooled, admixed with 2% of water, and discharged.

Use Examples

Example 7

A product was prepared in analogy to example 1, as a 70% strength by weight solution in Laromer® LR 8863, without addition of water, and was mixed with different amounts of water, followed by examination of the appearance and the viscosity.

|  | Viscosity at 25° C. | Fluidity at 25° C. | Miscibility |
| --- | --- | --- | --- |
| none | 600 Pas | no | clear |
| 1% water | 322 Pas | poor | clear |
| 2% water | 170 Pas | good | clear |
| 5% water | 82 Pas | very good | cloudy |

It is seen that without the addition of water, the formulation is not fluid, and on addition of too much water, it turns cloudy. There is therefore a narrow window remaining, within which both the viscosity and the performance properties are favorable.

Example 8

Various incorporable photoinitiators in accordance with the present invention and in accordance with DE 10 2006 047863 were prepared and were formulated with radiation-curable acrylates to give a print varnish.

Example 5 from DE 10 2006 047863 was repeated and was considered as pure initiator, based on its photoinitiator content (comparative a), or as coating material, based on its reactive diluent content (comparative c).

Using the formulations, determinations were made of the cure rate, viscosity, gloss, abrasion stability, and solvent resistance.

For this purpose, the varnish was coated using a 6 μm wire doctor onto a Leneta card, and exposed using a M-30-2×1-BLKU UV unit from IST, which is equipped with a 200 W/cm Hg medium-pressure lamp with adjustable power. The cure rate was determined using the fingernail. When the surface showed no scratches, the varnish was considered to be cured.

The gloss was determined at 60° on Leneta card using a Byk-Gardner micro-tri-gloss gloss meter. After 5 double rubs (back and forth) with a Scotch Brite® 07448 pad (from 3M), the abrasion resistance was determined by means of the drop in gloss.

|  | Comparative a | Comparative b | Inventive | Comparative c |
| --- | --- | --- | --- | --- |
| Example 5 from DE 10 2006 047863 | 15.0 |  |  |  |
| Example 2 from DE 10 2006 047863 (i.e., no water) |  | 15 |  |  |
| Example 5, i.e., containing 2% by weight water |  |  | 15.0 |  |
| Example 5 from DE 10 2006 047863 |  |  |  | 100 |
| Laromer® LR 8986 | 27 | 27 | 27 |  |
| Laromer® PO77F | 33 | 33 | 33 |  |
| Tripropylene glycol diacrylate | 39.8 | 39.8 | 39.8 |  |
| EFKA 7305 | 0.2 | 0.2 | 0.2 |  |
| Sum total | 100 | 100 | 100 |  |
| Cure rate | 3 m/min | 18 m/min | 15 m/min | 5 m/min |
| Viscosity of reaction mixture | 0.2 Pas | 600 Pas | 170 Pas | — |
| Viscosity of coating material | 0.3 Pas | 0.6 Pas | 0.4 Pas | 0.2 Pas |
| Gloss | 85 | 92 | 92 | 70 |
| Abrasion resistance (residual gloss after 5 double rubs with Scotch Brite 07448 (3M)) | 49 | 77 | 77 | 61 |
| MEK resistance double rubs | <10 | 30 | 30 | 30 |

Laromer® LR 8986 is a commercial mixture of epoxy acrylate and triacrylate of ethoxylated trimethylolpropane, from BASF SE, Ludwigshafen.
Laromer® PO 77F is a commercial, amine-modified, approximately trifunctional polyether acrylate from BASF SE, Ludwigshafen.
EFKA 7305 is a commercial additive for flow and surface smoothness, from BASF SE, Ludwigshafen.

It is seen that in the inventive example it is possible to lower the viscosity even of the print varnish by addition of water. In comparative b, however, the reaction mixture according to example 2 from DE 10 2006 047863 (i.e., no water) is not fluid and is therefore difficult to formulate, and also the viscosity of the print varnish is too high for an optimum coating outcome.

From comparatives a and c it is apparent that example 5 from DE 10 2006 047863, in direct comparison with the inventive example, exhibits poorer performance properties, such as a lower residual gloss and poorer abrasion resistance, and has inadequate reactivity.

Example 9

The photoinitiators of the invention from example 5 (in example 9a), and example 6 (in example 9b) were used in an offset printing-ink, with Irgacure® 2959 selected as comparative. The concentration of Irgacure® 2959 in the comparative example corresponded to the concentration of the chromophore in the photoinitiator of the invention. All of the components were mixed and dispersed on a Bühler laboratory roll mill, until all of the photoinitiators had dissolved.

The printing-ink was then printed with a coat weight of 1.7 g/m² onto coated cardboard, using an offset sample printing instrument from Prüfbau, and exposed using a M-30-2×1-BLKU UV exposure unit from IST at 80 W/cm (aluminum reflectors). Through-cure was determined using the REL Tester (PTC instrument, from Prüfbau). The colored density was determined using an SPM55 densitometer from Gretag-Macbeth.

|  | Ex. 9a | Ex. 9b | Comparative |
| --- | --- | --- | --- |
| Heliogen Blue D7088 | 16 | 16 | 16 |
| Ebecryl 657 | 19 | 19 | 20 |
| Ebecryl 3700 | 17 | 17 | 18 |
| Laromer® PE 9084 | 19 | 19 | 20 |
| Laromer® GPTA | 16 | 16 | 19 |

|  | Ex. 9a | Ex. 9b | Comparative |
|---|---|---|---|
| Luwax ® AF30 | 1 | 1 | 1 |
| Irgacure ® 369 | 4 | 4 | 4 |
| Irgacure ® 2959 |  |  | 2 |
| Initiator from example 5 | 8 |  |  |
| Initiator from example 6 |  | 8 |  |
| Sum total | 100 | 100 | 100 |
| Cure rate m/min | 180 | 180 | 130 |
| Color density of print | 1.41 | 1.53 | 1.37 |

Surprisingly it is found that the initiators of the invention, for the same chromophore concentration, in fact have a markedly higher cure rate than the comparative example. The color density, as a measure of the intensity of the colored print, is in fact higher for example 9b, where a fatty acid alcohol was used, than in the case of the other experiments, which points additionally to a dispersing of the photoinitiator of the invention.

The invention claimed is:

1. A process for preparing an incorporable photoinitiator of low viscosity, the process comprising
   1) synthesizing a polyurethane A comprising, in reacted form:
   (a) an organic polyisocyanate comprising an allophanate group and having an NCO functionality of at least 2, synthesized from an aliphatic $C_4$ to $C_{20}$ alkylene diisocyanate,
   (b) a compound having at least one isocyanate-reactive group and at least one radically polymerizable unsaturated group,
   (c) a photoinitiator having at least one isocyanate-reactive group,
   (d) optionally a further diisocyanate, polyisocyanate, or both, which is different from (a),
   (e) optionally a compound having at least two isocyanate-reactive groups, and
   (f) optionally a compound having precisely one isocyanate-reactive group,
   under an anhydrous condition, in the presence of less than 1000 ppm by weight of a compound comprising at least one element selected from the group consisting of bismuth, zinc and titanium, to obtain the polyurethane A; and
   2) mixing the polyurethane A with 0.5% to 4% by weight of water, based on an amount of the polyurethane A.

2. The process according to claim 1, wherein component (b) is bonded via allophanate groups to component (a).

3. The process according to claim 2, wherein an amount of allophanate groups, calculated as $C_2N_2HO_3$=101 g/mol, is 1% to 28% by weight.

4. The process according to claim 1, wherein the compound (c) has at least one formula selected from the group consisting of

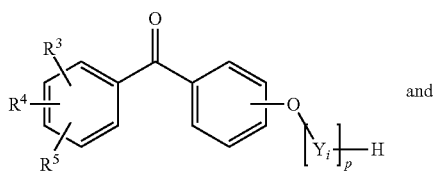

and

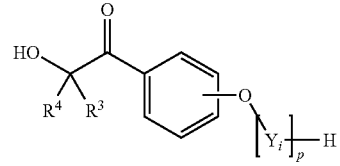

in which
R$^3$, R$^4$, and R$^5$ each independently of one another are hydrogen, an alkyl group comprising 1 to 4 carbon atoms or an alkyloxy group comprising 1 to 4 carbon atoms,
p is 0 or an integer from 1 to 10, and
$Y_i$ for i=1 to p independently of one another are selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—.

5. The process according to claim 1, wherein the compound (c) is selected from the group consisting of 2-hydroxy-2-methyl-1-phenyl-propan-1-one, 1-hydroxycyclohexyl phenyl ketone, 1-[4-(2-hydroxyethoxy)phenyl]-2-hydroxy-2-methyl-1-propan-1-one, 2-hydroxy-1-{4-[4-(2-hydroxy-2-methyl-propionyl)benzyl]phenyl}-2-methylpropan-1-one, 2-hydroxy-1-[4-[hydroxy[4-(2-hydroxy-2-methylpropanoyl)phenyl]methyl]phenyl]-2-methyl-propan-1-one, [4-[3-(4-benzoylphenoxy)-2-hydroxypropoxy]phenyl]phenylmethanone, benzoin, benzoin isobutyl ether, benzoin tetrahydropyranyl ether, benzoin methyl ether, benzoin ethyl ether, benzoin butyl ether, benzoin isopropyl ether, 7H-benzoin methyl ether, 2-hydroxy-2,2-dimethylacetophenone, and 1-hydroxyacetophenone.

6. The process according to claim 1, wherein the polyurethane A comprises, in reacted form, a compound (f) comprising an alkoxylated aliphatic alcohol having a formula $$R^9-O-[-Z_i-]_q-H$$

in which
R$^9$ is an alkyl radical having 1 to 20 carbon atoms,
q is a positive integer from 1 to 15, and
$Z_i$ for i=1 to q independently of one another may be are selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—.

7. The process according to claim 1, wherein compound comprising at least one element selected from the group consisting of bismuth, zinc and titanium is selected from the group consisting of a zinc carboxylate of a carboxylate which has at least six carbon atoms, a bismuth carboxylate of a carboxylate which has at least six carbon atoms, and a titanium tetraalcoholate, Ti(OR)$_4$, of an alcohol ROH having 1 to 8 carbon atoms.

8. The process according to claim 1, wherein the polyurethane A comprises, in reacted form, (d) the further diisocyanate, polyisocyanate, or both, which is different from (a).

9. The process according to claim 1, wherein the polyurethane A comprises, in reacted form, (e) the compound having at least two isocyanate-reactive groups.

10. The process according to claim 1, wherein the polyurethane A comprises, in reacted form, (f) the compound having precisely one isocyanate-reactive group.

11. The process according to claim 1, wherein the polyurethane A comprises, in reacted form, (d) and (e).

12. The process according to claim 1, wherein the polyurethane A comprises, in reacted form, (d) and (f).

13. The process according to claim 1, wherein the polyurethane A comprises, in reacted form, (e) and (f).

14. The process according to claim 1, wherein the polyurethane A comprises, in reacted form, (d), (e) and (f).

15. The process according to claim 1, wherein the incorporable photoinitiator has a viscosity of not more than 400 Pas measured according to DIN EN ISO 3219, shear rate D, 100 s$^{-1}$, at 23° C.

16. The process according to claim 1, wherein the incorporable photoinitiator has a viscosity of less than 300 Pas measured according to DIN EN ISO 3219, shear rate D, 100 s$^{-1}$, at 23° C.

17. The process according to claim 1, wherein the incorporable photoinitiator has a viscosity of less than 250 Pas measured according to DIN EN ISO 3219, shear rate D, 100 s$^{-1}$, at 23° C.

18. The process according to claim 1, wherein the incorporable photoinitiator has a viscosity of less than 200 Pas measured according to DIN EN ISO 3219, shear rate D, 100 s$^{-1}$, at 23° C.

* * * * *